S. DAY.
Cultivator.
No. 83,838.                         Patented Nov. 10, 1868.
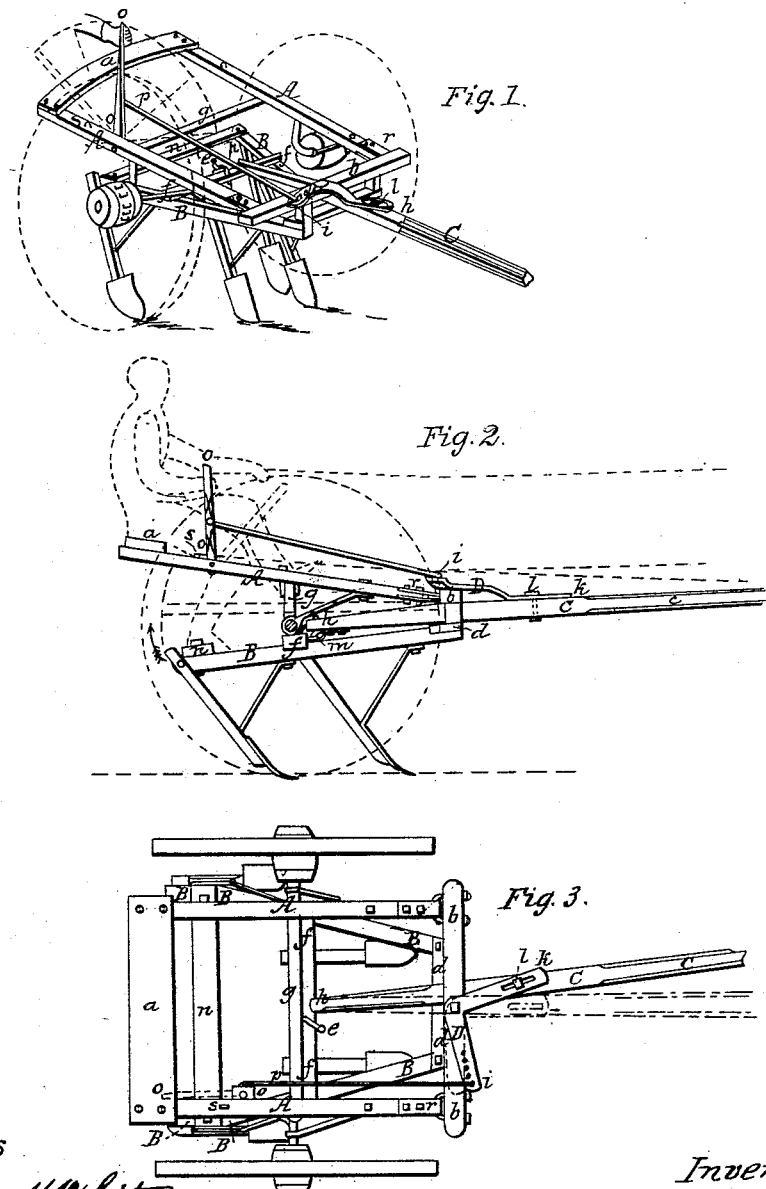
Witnesses
Barrett White
Thomas H. Griffith
Inventor
Samuel Day

SAMUEL DAY, OF DELAVAN, ILLINOIS.

Letters Patent No. 83,838, dated November 10, 1868.

IMPROVEMENT IN CULTIVATORS.

The Schedule referred to in these Letters Patent and making part of the same.

Be it known that I, SAMUEL DAY, of Delavan, in the county of Tazewell, and State of Illinois, have invented a new and useful machine, being an Improvement in Corn and Grain-Cultivators; and I do hereby declare that the following is a full, clear, and exact description of the construction and operation of the same, reference being had to the annexed drawings, making a part of this specification, in which—

Figure 1 is a perspective view.
Figure 2, a longitudinal elevation
Figure 3, a plan.

In the drawings, like letters refer to like parts.

My machine consists of the ordinary frame B B, to which the four shovels are attached. Above this, I place another frame, which lies immediately on the axle $g$. This frame A A is composed of the seat-bars A A, united at the rear by the seat $a$, and hinged at the forward end to the cross-bar $b$ by the iron hinges $r\ r$. The latter bar, $b$, is supported on blocks, or their equivalents, resting on the cross-bar $d$ of the frame B B, which carries the shovels. The axle of the supporting-wheels passes beneath the upper frame A A, at its centre, to which it is attached by iron hooks at $g'$, and steadied by braces or iron rods, starting from the axle at the hub, embracing the axle at that place, and running forwards, and bolted beneath the bar A on side of frame. The axle is of iron, and bent downwards at a right angle at the outside of the upper frame, at each side of the frame, for a length of thirteen inches, when it again assumes a straight line, and receives the hub of the wheel. The bent axle $g$ is designed to admit beneath it the lower frame B B in raising the shovels. The bar $f$ across the centre of the lower frame B B is provided with a revolving hook, $e$, which receives the axle when the lower frame is brought to that height. To this bar $f$ is also attached the end of the tongue $c\ c$ by means of a swivel-joint, composed of a hook under the end of the tongue, and an eye or staple in the bar $f$. The tongue passes between the forward bars $d$ and $b$ of each frame, where it is allowed free motion laterally forwards of the swivel. The tongue, however, is connected with an iron crank or lever, D, which has a pivot at the centre of the bar D, in front of the upper frame over the tongue. One arm of this lever or crank D extends forward fifteen inches, and is bent down to the tongue, and is perforated at the end with a slot, through which a bolt, $l$, passes into and through the tongue perpendicularly. The other arm of the crank is of the same length, and is pierced with several holes for the admission of the forward end of the iron rod $p$. The rod $p$ passes backwards, and is secured to the hand-lever $o$ within reach of the driver on the seat. The rod is attached to such a point above the frame, to the hand-lever $o$, as shall give the crank D sufficient motion or action on the tongue.

The dotted red lines in fig. 2 show the position of both frames when hitched together at the bar $f$ by means of the hook $e$.

The operation of this cultivator is as follows:

The frame B B, bearing the shovels, is kept suspended to the axle $g$ by means of the hook $e$ while proceeding to the field, when the latter is removed by the driver's foot, and the shovels then enter the soil. The driver's foot rests on the bar $n$ in rear of the lower frame B B, by pressure on which he regulates depth of plowing. When he fears the shovels or a shovel will strike any of the hills too deeply, or other causes occurring by which the tender growth might be injured by the shovels, the course of the machine can be instantaneously altered by use of the lever $o$, and its operation on the crank D connected with the tongue.

The advantages of this machine are as follows:

The suspension of the shovels from the forward part of the seat-frame A A allows the shovels to accommodate themselves to any level, either above or below the line travelled by the wheels.

Second, the superior advantages for dodging or avoiding injury to the plants out of the line of the row, or crooked rows, in cultivating, on account of the instantaneous operation of the crank D, and this without leaving any ground unturned, as is the case with most cultivating-machines.

Also the use of this machine for the cultivation of small grain by removing the rear end of the rod $p$ from the lever $o$, and inserting the end in the staple $s$, fixed in the surface of the bar A on side of frame, thus steadying the tongue, as "dodging" will not then be necessary.

What I claim as my invention, and desire to secure by Letters Patent, is—

In a corn-cultivator, the mode of guiding the machine and shovels by means of the crank D and connections, with the lever $o$, as and for the purposes above described.

SAMUEL DAY.

Witnesses:
BARRETT WHITE,
THOMAS H. GRIFFITHS.